(12) United States Patent
Vitan et al.

(10) Patent No.: US 9,741,508 B2
(45) Date of Patent: Aug. 22, 2017

(54) PANEL ASSEMBLY AND BUTTON TREE THEREFOR

(71) Applicant: General Electric Company, Schenectady, NY (US)

(72) Inventors: Craig Robert Vitan, Louisville, KY (US); Raghavendra Eshwarappa, Hyderabad (IN); Praveen Kumar Nandigama, Hyderabad (IN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 532 days.

(21) Appl. No.: 14/226,941

(22) Filed: Mar. 27, 2014

(65) Prior Publication Data

US 2015/0279584 A1    Oct. 1, 2015

(51) Int. Cl.
*H01H 13/70*    (2006.01)
*H01H 13/86*    (2006.01)
*B60K 37/06*    (2006.01)

(52) U.S. Cl.
CPC ............. *H01H 13/86* (2013.01); *B60K 37/06* (2013.01); *H01H 2221/026* (2013.01);
(Continued)

(58) Field of Classification Search
CPC .. H01H 3/04; H01H 3/06; H01H 3/26; H01H 3/50; H01H 3/52; H01H 3/66; H01H 2013/00; H01H 2003/007; H01H 2003/167; H01H 2009/20; H01H 2205/024; H01H 2205/028; H01H 2221/074; H01H 2223/018; H01H 2223/026; H01H 2223/028; H01H 2223/05; H01H 2223/054; H01H 2223/07; H01H 2223/074; H01H 13/70; H01H 3/00; H01H 3/02; H01H 3/12; H01H 5/04; H01H 9/00; H01H 9/0044; H01H 9/02; H01H 9/0235; H01H 9/20; H01H 9/22; H01H 13/00; H01H 13/02;
(Continued)

(56) References Cited

U.S. PATENT DOCUMENTS 4,375,017 A * 2/1983 Smith ................ H01H 13/7013
                                                    200/275
6,080,940 A * 6/2000 Rice ....................... H01H 13/70
                                                    200/341
(Continued)

FOREIGN PATENT DOCUMENTS

TW        2009-29293        7/2009

*Primary Examiner* — Anthony R. Jimenez
(74) *Attorney, Agent, or Firm* — Dority & Manning, P.A.

(57) ABSTRACT

Panel assemblies and button trees for panel assemblies are provided. In one embodiment, a button tree includes a frame, and a plurality of arms extending from the frame. At least one of the plurality of arms includes a plurality of branches. The button tree further includes a button connected to the frame by the plurality of arms, wherein each branch of the plurality of branches contacts the button. In another embodiment, a button tree includes a frame, and a plurality of arms extending from the frame. The button tree further includes a button defining a central axis, the button connected to the frame by the plurality of arms, the button including a face surface and an edge surface. The button tree further includes a locating feature extending on the edge surface generally co-axially with the central axis.

20 Claims, 5 Drawing Sheets

(52) U.S. Cl.
CPC . *H01H 2223/056* (2013.01); *H01H 2231/026* (2013.01); *H01H 2233/03* (2013.01)

(58) Field of Classification Search
CPC ........ H01H 13/04; H01H 13/12; H01H 13/14; H01H 13/50; H01H 13/56; H01H 2003/12; H01H 2221/00; H01H 2221/002; H01H 2223/01; H01H 2223/034; H01H 2223/0345; H01H 2223/036; H01H 2231/012; H01H 13/86; H01H 2221/026; H01H 2223/056; H01H 2231/026; H01H 2233/03
USPC ............. 200/314, 341, 345, 1 R, 50.01, 237, 200/293–298, 302.2, 318, 329; 235/145 R, 145 A
See application file for complete search history.

(56) References Cited

U.S. PATENT DOCUMENTS

| | | | |
|---|---|---|---|
| 6,384,355 B1 * | 5/2002 | Murphy | H01H 13/70 200/344 |
| 6,844,511 B1 * | 1/2005 | Hsu | H01H 25/041 200/5 R |
| 7,244,898 B2 | 7/2007 | Kim | |
| 7,371,984 B2 * | 5/2008 | Lee | H01H 13/7057 200/296 |
| 8,080,743 B2 | 12/2011 | Wang et al. | |
| 2005/0178166 A1 | 8/2005 | Kim et al. | |
| 2010/0025214 A1 | 2/2010 | Roose et al. | |
| 2011/0036693 A1 * | 2/2011 | Lin | H01H 13/023 200/314 |

* cited by examiner

PANEL ASSEMBLY AND BUTTON TREE THEREFOR

FIELD OF THE INVENTION

The present disclosure relates generally to panel assemblies, such as panel assemblies utilized with appliances and in other various applications. In particular, the present disclosure is directed to button trees utilized in panel assemblies.

BACKGROUND OF THE INVENTION

Panel assemblies are utilized in a wide variety of applications. For example, various household appliances, such as washing machine appliances, dryer appliances, etc. utilized panel assemblies to facilitate user input for appliance operation. Panel assemblies are also utilized in other various applications, such as automobile applications, etc.

Some panel assemblies include buttons which a user presses to input a desired command to the panel assembly for a desired application. Buttons are typically provided on button trees, which support the button behind the panel assembly. In many cases, a button is supported by one or more arms. The end of each arm may contact the button, such that the button is suspended by the arms.

However, problems have been experienced by users of currently known button tree and arm designs. For example, when a user presses a button at an off-center location, the button will twist or rock due to this uneven force. In some cases, the button can become stuck in a depressed position due to this movement.

Accordingly, improved button trees, and panel assemblies which utilize such button trees, are desired. In particular, button trees which facilitate smooth button operation despite experiencing off-center forces would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, a button tree is provided. The button tree includes a frame, and a plurality of arms extending from the frame. At least one of the plurality of arms includes a plurality of branches. The button tree further includes a button connected to the frame by the plurality of arms, wherein each branch of the plurality of branches contacts the button.

In accordance with another embodiment, a button tree is provided. The button tree includes a frame, and a plurality of arms extending from the frame. The button tree further includes a button defining a central axis, the button connected to the frame by the plurality of arms, the button including a face surface and an edge surface. The button tree further includes a locating feature extending on the edge surface generally co-axially with the central axis.

In accordance with another embodiment, a panel assembly is provided. The panel assembly includes a button tree. The button tree includes a frame, and a plurality of arms extending from the frame. The button tree further includes a button defining a central axis, the button connected to the frame by the plurality of arms, the button including a face surface and an edge surface. The button tree further includes a locating feature extending on the edge surface generally co-axially with the central axis. The panel assembly further includes a control panel at least partially defining a passage, the passage including a mating locating feature. The button is disposed within the passage.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
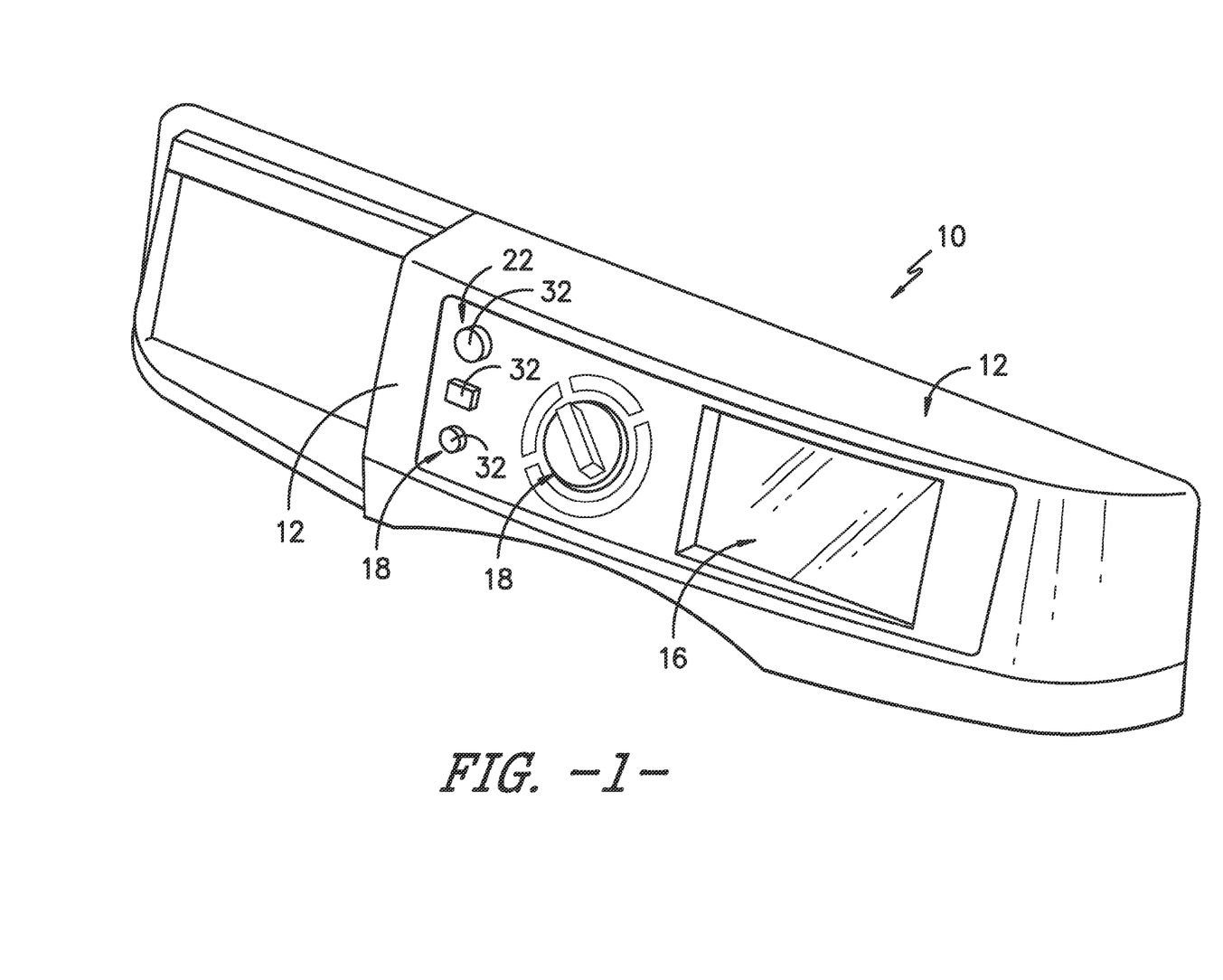
FIG. 1 is a front perspective view of a panel assembly in accordance with one embodiment of the present disclosure.
Figure 2:
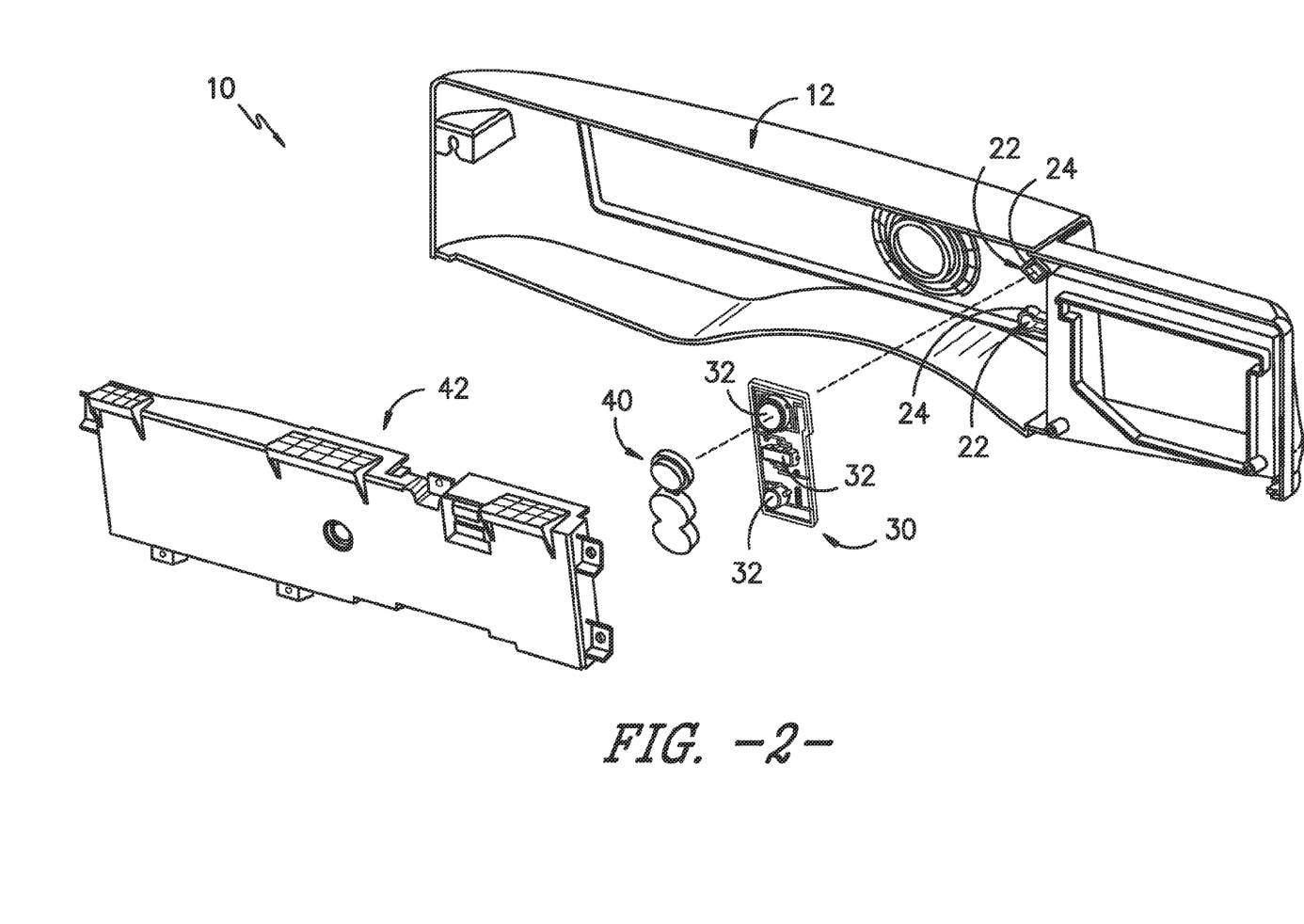
FIG. 2 is a rear exploded perspective view of a panel assembly in accordance with one embodiment of the present disclosure.

Referring to FIGS. 1 and 2, embodiments of a panel assembly 10 are illustrated. A panel assembly 10 may include a control panel 12. The control panel 12 may include a face surface 14 on or in which various user inputs and displays may be provided for user interaction. For example, a display screen 16 may be provided, as well as user inputs 18 having various shapes and sizes.

Control panel 12 may further at least partially define one or more passage 20, in which buttons may be disposed, as discussed herein. For example, openings 22 for each passage 20 may be defined in the face surface 15, and the passage 20 may extend from the face surface 15. A collar 24 may additionally be provided for one or more passages 20. The collar 24 may extend from, for example, the face surface 15, and may further define the passage 20.

Panel assembly 10 may additionally include one or more button trees 30. Each button tree 30 includes one or more buttons 32, each of which may be disposed in a passage 20. Further, panel assembly 30 may include one or more biasing elements 40. A biasing element 40 may generally contact a button 32 and bias the button 32 towards the control panel 12, such as in the passage 20 towards the opening 22. This biasing force may allow the button 32 to return to an original position relative to the passage 20 and control panel 12.

In exemplary embodiments as illustrated, the biasing element 40 may be a pad washer. Alternatively, however, the biasing element 40 may be a coil spring or any other suitable component that provides a biasing force as required.

Panel assembly 10 may further include a rear cover panel 42. The rear cover panel 42 may generally secure and/or enclose various other components, such as the button tree 30 and biasing element 40, relative to the control panel 12.

Figure 3:
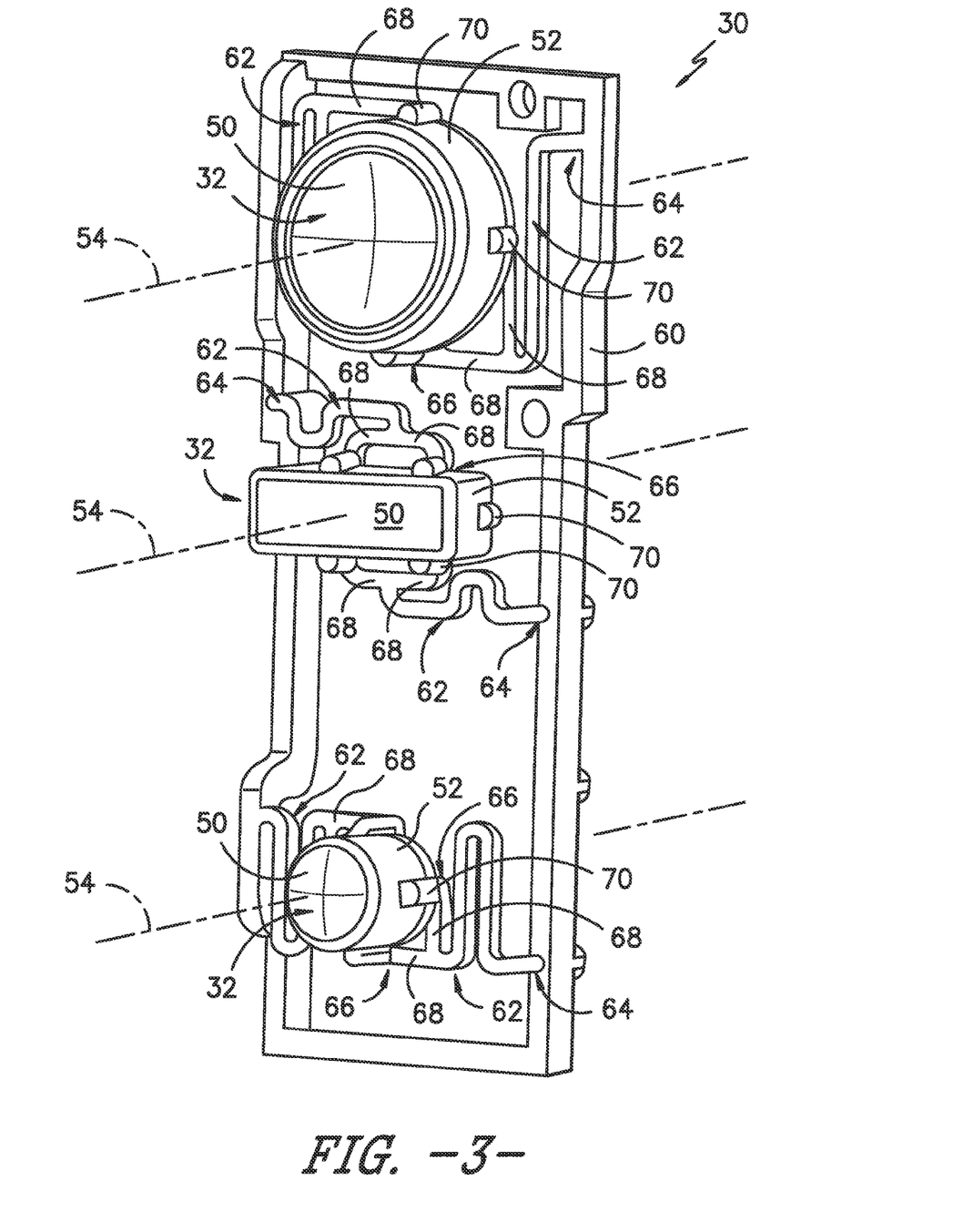
FIG. 3 is a front perspective view of a button tree in accordance with one embodiment of the present disclosure.
Figure 4:
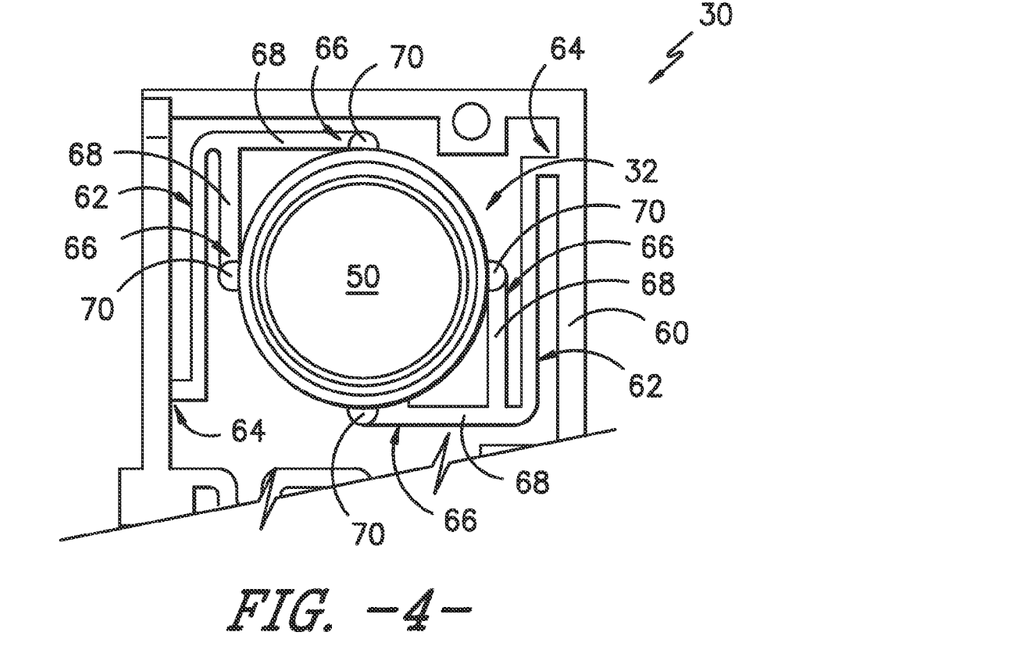
FIG. 4 is a front view of a button connected on a button tree in accordance with one embodiment of the present disclosure.
Figure 5:
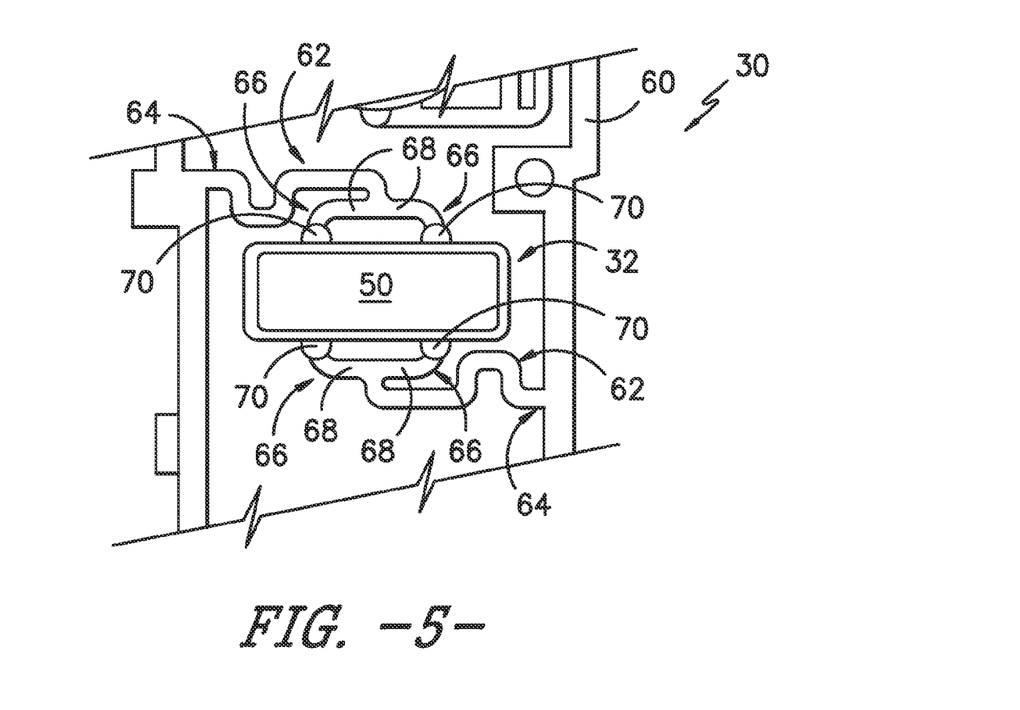
FIG. 5 is a front view of a button connected on a button tree in accordance with another embodiment of the present disclosure.

Referring now to FIGS. 3 through 5, embodiments of button trees 30 and the various components thereof are illustrated. A button tree 30 includes, as discussed, one or more buttons 32. Each button 32 may generally include a face surface 50 and an edge surface 52. The face surface 50 is generally the surface displayed to a user in or through an associated passage 20. The face surface 50 may have any suitable shape and size. For example, a face surface 50 may be circular, oval, rectangular, rounded rectangular, triangular, or have any other suitable shape. The edge surface 52 may generally extend from the face surface 50, such as generally transversely to the face surface 50, and define a periphery of the button 32.

Each button 32 may additionally define a central axis 54, which may generally extend through the center of the face surface 50. Face surface 50 may, for example, be generally transverse to the central axis 54, while edge surface 52 may extend from the face surface 50 generally along the central axis 54.

The buttons 32 may be generally disposed within a frame 60, such that the frame generally peripherally surrounds the buttons 32. Further, a plurality of arms 62 may connect each button 32 to the frame 60. For example, an arm 62 may extend between a first end 64 and one or more second ends 66, as discussed below. The first end 64 may be in contact with and connected to the frame 60, such that the arm 62 extends from the frame 60. Each second end 66 may be in contact with and connected to a button 32, such as to the edge surface 52 thereof, such that the button 32 is connected to the frame 60 by the arms 62.

As illustrated, one or more arms 62 may advantageously include a plurality of branches 68. The branches 68 may generally split from a portion of the arm 62 that includes the first end 64, and each branch 68 may include a second end 66 of the arm 62. Each branch 68 may be in contact and connected to the button 32, such as to the edge surface 52 thereof, through the contact and connection of the second end 66 of the branch 68. The branches 68 and the arms 62 in general may, for example, extend generally transverse to the central axis 54.

In exemplary embodiments, an arm 62 may include two branches 68. Alternatively, however, an arm 62 may include three, four, five or more branches 68. Referring to FIG. 4, in some embodiments, for example, the branches 68 may generally form a V-shape, wherein the branches 68 extend at angles away from each other towards the second ends 66. Referring to FIG. 5, in other embodiments, for example, the branches 68 may generally form a U-shape, wherein portions of the branches 68 proximate the second ends 68 extend generally parallel to each other. In still other embodiments, and suitable shapes of the branches 68 are within the scope and spirit of the present disclosure. It should be understood that the branches 68 or any portions thereof may be generally linear or curvilinear. For example, with respect to the U-shape, each branch may include an initial curvilinear portion extending from the arm 62 and a subsequent linear portion extending from the curvilinear portion, or an initial linear portion extending from the arm 62 and a subsequent linear portion extending from the initial linear portion (at for example an approximately perpendicular direction), or an initial linear portion extending from the arm 62 and a subsequent curvilinear portion extending from the linear portion. With respect to the V-shape, each branch or any portion thereof may be linear or curvilinear. Further, while in exemplary embodiments the branches 68 may generally be mirror images of each other as illustrated, in other embodiments the branches 68 may differ in shape, length, etc.

The use of arms 62 which include branches 68 in accordance with the present disclosure may advantageously stabilize the button 32 within the passage 20 and when the button 32 encounters off-center forces applied to the face surface 50 thereof. For example, off-center forces may be distributed generally evenly to the branches 68 and arms 62 that are connected to a button 32, such that tilting or rocking of the button 32 due to such force is generally reduced.

Figure 6:
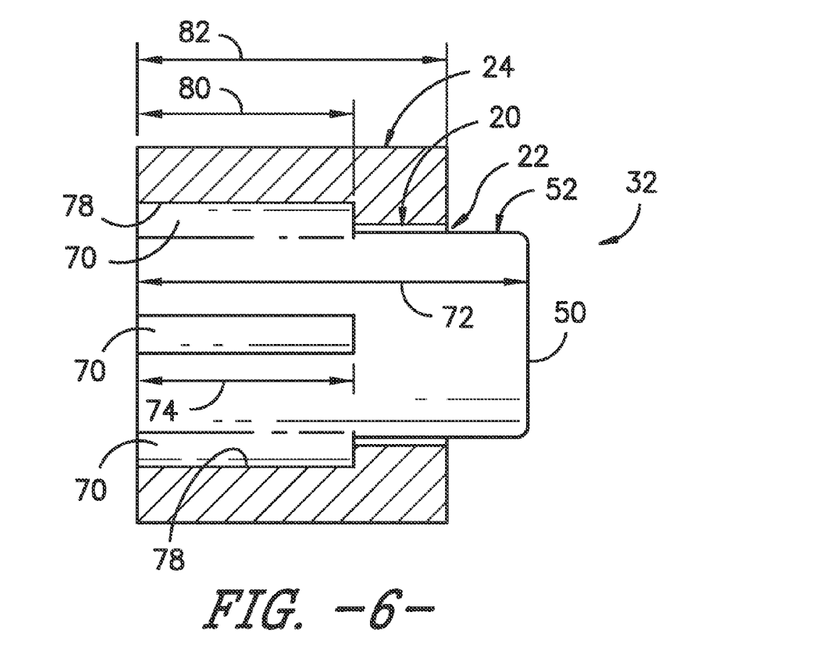
FIG. 6 is a side cross-sectional view of a button in a passage of a panel assembly in accordance with one embodiment of the present disclosure.
Figure 7:
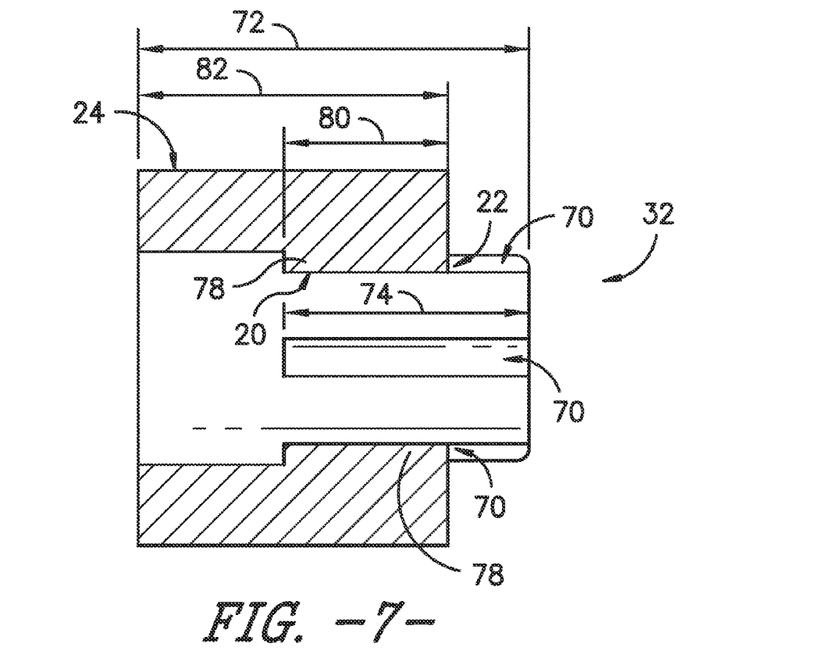
FIG. 7 is a side cross-sectional view of a button in a passage of a panel assembly in accordance with one embodiment of the present disclosure.

Referring again to FIG. 3 as well as FIGS. 6 and 7, in some embodiments a button tree 30 may include one or more locating features 70. Locating features 70 may generally extend along a surface of one or more buttons 32 of the button tree 30. In exemplary embodiments a button 32 may include a plurality of locating feature 70, such as at the intersection of each second end 66 and the button 32, such as the edge surface 52 thereof. Each locating feature 70 may extend, such as on the edge surface 52 of a button, generally co-axially with the central axis 54.

In exemplary embodiment, a locating feature 70 may have a generally arcuate cross-sectional shape, such as in some embodiments semi-circular. Alternatively, a locating feature 70 may have a rectangular or other suitable cross-sectional shape. Referring to FIGS. 3 and 6, in some exemplary embodiments, a locating feature 70 may be a protrusion, which may for example extend from the edge surface 52. Referring to FIG. 7, in other embodiments the locating feature 72 may be a channel, which may for example be defined in the edge surface 52.

In some embodiments, such as in particular when the locating feature 70 is a protrusion, the locating feature 70 may extend from an intersection of one of the plurality of arms 62, such as the second end 66 thereof, and the edge surface 52. In other embodiments, such as in particular when the locating feature 70 is a channel, the locating feature 70 may be spaced from the intersection of the arm 62, such as the second end 66 thereof, and the edge surface 52.

Referring to FIGS. 6 and 7, the edge surface 52 of a button 32 may have a depth 72, and a locating feature 70 may have a length 74. The depth 72 and length 74 may generally be co-axial as illustrated. In exemplary embodiments, as shown, the locating feature 70 extends along only a portion of the edge surface 52. Accordingly, the length 74 of the locating feature 70 may be less than the depth 72 of the edge surface 52.

The locating features 70 associated with a button 32 may serve to further advantageously stabilize the button 32 when the button 32 encounters off-center forces applied to the face surface 50 thereof, such as by resisting twisting and rocking of the button 32. Further, the locating features 70 may locate the button 32 within the associated passage 20, and restrict movement of the button 32 within the passage 20.

For example, a passage 20 may include one or more mating locating features 78. Each mating locating feature 78 may, for example, have a cross-sectional shape that corresponds to the cross-sectional shape of the associated locating feature 72. The mating locating features 78 may be positioned such that a locating feature 70 and associated mating locating feature 78 generally mate to locate an associated button 32 when the button 32 is inserted into the passage 20. In some exemplary embodiments, such as wherein a locating feature 70 is a protrusion, the mating locating feature 78 may be a channel, as illustrated in FIG. 6. In other exemplary embodiments, such as wherein a locating feature 70 is a channel, the mating locating feature 78 may be a protrusion, as illustrated in FIG. 7.

As illustrated, a locating feature 70 and mating locating feature 78 may interact to restrict movement of the associated button 32 within the passage 20, such as along the central axis 54. For example, as discussed, a locating feature 70 may have a length 74 that is less than a depth of the edge surface 52. Further, a mating locating feature 78 may have a length 80 that is less than a (generally co-axial) length 82 of the passage 20. Movement generally along the central axis 54 may thus be restricted by the allowable movement of the locating feature 70 within the mating locating feature 78 (or vice-versa) due to the lengths 74, 80 thereof. In particular, movement may be restricted in the direction within the passage 20 towards and through the opening 22 thereof, such that the button 32 is restricted from passing through (or entirely through) the opening 22. When a user is not manipulating the button 32, the button 32 may thus be biased towards the opening 22 by the biasing element 40 but restricted from excess movement in that direction by the interaction of the locating feature 70 and mating locating features 78.

It should be noted that, in exemplary embodiments, the various button tree 30 components may be integral. For example, the button tree 30 may be molded as a singular component which includes a frame 60, one or more buttons 32, a plurality of arms 62 (which may include branches 68) and, optionally, one or more locating features 70. Alternatively, however, one or more of the various button tree 30 components may be separately formed and assembled to form the button tree 30. The button tree 30 components in exemplary embodiments may be formed from a suitable plastic material, such as polycarbonate, or alternatively from any suitable material or materials.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A panel assembly, comprising:
    a button tree, the button tree comprising:
        a frame;
        a plurality of arms extending from the frame;
        a button defining a central axis, the button connected to the frame by the plurality of arms, the button comprising a face surface and an edge surface, the edge surface defining an outer periphery of the button and extending generally transversely from the face surface; and
        a plurality of locating features, at least one locating feature of the plurality of locating features extending on the edge surface generally co-axially with the central axis; and
    a control panel at least partially defining a passage, the passage comprising a plurality of mating locating features, at least one mating locating feature of the plurality of mating locating features being associated with a discrete locating feature of the plurality of locating features, and wherein at least one mating locating feature of the plurality of mating locating features is a channel
    wherein the button is disposed within the passage.

2. The panel assembly of claim 1, wherein the control panel comprises a collar surrounding and further defining the passage.

3. The panel assembly of claim 1, wherein at least one locating feature of the plurality of locating features is a protrusion.

4. The panel assembly of claim 1, wherein at least one locating feature of the plurality of locating features is a channel and at least one mating locating feature of the plurality of mating locating features is a protrusion.

5. The panel assembly of claim 1, wherein at least one locating feature of the plurality of locating features and at least one mating locating feature of the plurality of mating locating features interact to restrict movement of the button along the central axis.

6. The panel assembly of claim 1, further comprising a biasing element biasing the button towards the control panel.

7. The panel assembly of claim 1, wherein at least one of the plurality of arms comprises a plurality of branches, and wherein at least one branch of the plurality of branches contacts the button at a discrete locating feature.

8. A panel assembly, comprising:
    a button tree frame;
    a plurality of arms extending from the button tree frame, at least one of the plurality of arms comprising a plurality of branches;
    a button connected to the button tree frame by the plurality of arms, the button comprising a face surface and an edge surface, the edge surface defining an outer periphery of the button and extending generally transversely from the face surface, wherein each branch of the plurality of branches contacts the button at the edge surface;
    a plurality of locating features, at least one locating feature of the plurality of locating features extending on the edge surface generally co-axially with the central axis; and
    a control panel comprising a collar defining a passage, the collar comprising a plurality of mating locating features, wherein the button is disposed within the passage.

9. The panel assembly of claim 8, wherein at least one of the plurality of arms comprises a plurality of branches.

10. The panel assembly of claim 8, wherein the plurality of branches generally form a V-shape.

11. The panel assembly of claim 8, wherein the plurality of branches generally form a U-shape.

12. The panel assembly of claim 8, wherein at least one locating feature of the plurality of locating features is a protrusion and at least one mating locating feature of the plurality of mating locating features is a channel.

13. The panel assembly of claim 8, wherein at least one locating feature of the plurality of locating features is a channel and at least one mating locating feature of the plurality of mating locating features is a protrusion.

14. The panel assembly of claim 8, wherein the button defines a central axis, and wherein each branch of the plurality of branches extends generally transverse to the central axis.

15. A panel assembly, comprising:
- a control panel at least partially defining a passage, the passage comprising a plurality of mating locating features, wherein at least one mating locating feature of the plurality of mating locating features is a channel;
- a button tree frame secured relative to the control panel;
- a plurality of arms extending from the button tree frame;
- a button defining a central axis, the button connected to the button tree frame by the plurality of arms, the button comprising a face surface and an edge surface, the edge surface defining an outer periphery of the button and extending generally transversely from the face surface, the button being disposed within the passage;
- a plurality of locating features, at least one locating feature of the plurality of locating features extending on the edge surface generally co-axially with the central axis; and
- at least one locating feature of the plurality of locating features being associated with a discrete mating locating feature of the plurality of mating locating features.

16. The panel assembly of claim 15, wherein at least one locating feature of the plurality of locating features has an arcuate cross-sectional shape.

17. The panel assembly of claim 15, wherein at least one locating feature of the plurality of locating features is a protrusion.

18. The panel assembly of claim 15, wherein at least one locating feature of the plurality of locating features is a channel defined in the edge surface.

19. The panel assembly of claim 15, wherein at least one locating feature of the plurality of locating features extends from an intersection of one of the plurality of arms and the edge surface.

20. The panel assembly of claim 15, wherein a length of at least one locating feature of the plurality of locating features is less than a depth of the edge surface.

* * * * *

UNITED STATES PATENT AND TRADEMARK OFFICE
CERTIFICATE OF CORRECTION

PATENT NO. : 9,741,508 B2
APPLICATION NO. : 14/226941
DATED : August 22, 2017
INVENTOR(S) : Craig Robert Vitan

Page 1 of 1

It is certified that error appears in the above-identified patent and that said Letters Patent is hereby corrected as shown below:

In the Claims

In Line 19 of Column 6, a transitional form of punctuation should be added after "channel" (i.e. a ",", a ";", or something similar)

Signed and Sealed this
Twenty-second Day of May, 2018

Andrei Iancu
*Director of the United States Patent and Trademark Office*